(12) United States Patent
Schnur et al.

(10) Patent No.: US 6,672,434 B2
(45) Date of Patent: Jan. 6, 2004

(54) METHOD AND DEVICE FOR INFLUENCING THE TRANSFER OF VIBRATIONS OF A VIBRATION GENERATOR TO AN OBJECT CONNECTED TO IT, IN PARTICULAR OF ENGINE VIBRATIONS TO THE BODY OF A MOTOR VEHICLE

(75) Inventors: Juergen Schnur, Ditzingen (DE); Silvia Tomaschko, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 21 days.

(21) Appl. No.: 10/092,359

(22) Filed: Mar. 7, 2002

(65) Prior Publication Data

US 2002/0134628 A1 Sep. 26, 2002

(30) Foreign Application Priority Data

Mar. 7, 2001 (DE) .......................... 101 10 822

(51) Int. Cl.⁷ ................................ F16F 15/00
(52) U.S. Cl. .................... 188/266.7; 188/378; 267/136; 267/141; 267/153
(58) Field of Search .............. 188/378, 266.7, 188/267.2; 267/141, 153, 136, 140.11, 140.15; 381/71.4, 86; 248/562, 636; 180/300, 312, 902; 701/37, 38, 36; 280/5.5; 702/105; 700/280

(56) References Cited

U.S. PATENT DOCUMENTS

| | | | |
|---|---|---|---|
| 5,052,529 A | * 10/1991 | Sutcliffe et al. | ............. 188/378 |
| 5,332,061 A | 7/1994 | Majeed et al. | |
| 5,434,783 A | 7/1995 | Pal et al. | |
| 5,748,748 A | 5/1998 | Fischer et al. | |
| 5,826,864 A | 10/1998 | Barger | |
| 6,190,052 B1 | * 2/2001 | Schnur et al. | ............... 384/519 |
| 6,283,636 B1 | * 9/2001 | Schnur et al. | ............... 384/517 |
| 6,283,637 B1 | * 9/2001 | Schnur et al. | ............... 384/519 |
| 6,394,655 B1 | * 5/2002 | Schnur et al. | ............... 384/247 |
| 6,484,845 B1 | * 11/2002 | Schleicher et al. | ......... 181/207 |
| 2002/0173573 A1 | * 11/2002 | Borchers et al. | ............ 524/413 |

FOREIGN PATENT DOCUMENTS

| | | |
|---|---|---|
| DE | 19531402 A1 | 2/1997 |
| DE | 19642827 A1 | 10/1997 |
| DE | 19812748 C1 | 8/1999 |
| EP | 0470064 A2 | 2/1992 |
| EP | 1239183 A2 * | 9/2002 |
| GB | 2222657 A | 3/1990 |
| JP | 59183137 | 10/1984 |

* cited by examiner

Primary Examiner—Douglas C. Butler
(74) Attorney, Agent, or Firm—Crowell & Moring LLP

(57) ABSTRACT

A method and a device for influencing the transfer of vibrations of a vibration generator to an object connected to it, in particular of engine vibrations to the body of a motor vehicle. At least one piezo element is arranged as an actuator in the region of an intermediate element connecting the vibration generator to the object. Primary vibrations are transferred between the vibration generator and the object via the intermediate element. The actuator is induced in a controlled manner to undergo secondary vibrations. The total energy and/or the composition of the frequencies of the vibrations transferred via the intermediate element are changed by the actuator, and the remaining residual vibration is measured and used for controlling the secondary vibrations. Surprisingly good results are achieved in this way if the secondary vibrations are introduced in the region between the vibration generator and the intermediate element and if the residual vibration is measured in the region between the intermediate element and the point at which the intermediate element bears against the object.

21 Claims, 2 Drawing Sheets

METHOD AND DEVICE FOR INFLUENCING THE TRANSFER OF VIBRATIONS OF A VIBRATION GENERATOR TO AN OBJECT CONNECTED TO IT, IN PARTICULAR OF ENGINE VIBRATIONS TO THE BODY OF A MOTOR VEHICLE

BACKGROUND OF THE INVENTION

This application claims the priority of German Patent No. 101 10 822.2-13, filed Mar. 7, 2001, the disclosure of which is expressly incorporated by reference herein.

The invention relates to a method and a device for influencing the transfer of vibrations of a vibration generator to an object connected to it, in particular of engine vibrations to the body of a motor vehicle, as they occur for example in an automobile.

To change the vibrations emanating from a vehicle, in particular the noises which can be perceived in the passenger compartment, many measures have been taken, such as the use of various damping materials in the form of damping mats and the like as well as acoustic measures described below. The same of course applies to any object, such as machines which are connected to an object, for example, a floor or the hull of a submarine, etc.

U.S. Pat. No. 5,332,061 discloses a method for suppressing vibrations introduced into the vehicle body and a corresponding vehicle. The vibrations originate from the engine and are transferred at least indirectly via the engine supports to the vehicle body at the connecting points of the engine. To damp these vibrations, the vehicle has actuators designed as shakers (mechanical vibration exciters), which are arranged in the region of connecting points of the engine to the vehicle body. When the engine is operated, depending on the engine speed, the shakers are excited at the resonant frequencies in phase opposition to the vibrations coming from the engine, thereby damping the transfer of the vibrations. The frequencies and amplitudes of these secondary vibrations are taken from a previously recorded data.

U.S. Pat. No. 5,434,783 discloses a vehicle in which the audible noises within a passenger compartment are influenced by sound waves. In addition to the normal loudspeakers, a piezo element is used which induces the vehicle body to vibrate at least in certain regions and thereby influences the emission of sound waves. The piezo element functions as the coil of a loudspeaker, while the vehicle body functions as the vibrating diaphragm. With this method and this device, an improvement in the subjective perception within the passenger compartment is achieved.

A further refinement of the above development for influencing the subjectively perceived impression of driving is known from DE 195 31 402 A1. According to this document, both the air-borne sound and the structure-borne sound or vibrations perceived by the human body are influenced on the basis of one or more parameters, such as engine speed and vehicle velocity. For this purpose, certain data are obtained from a data field according to the sizes of the parameters and are converted with the assistance of vibration exciters into secondary vibrations, including secondary vibrations which can be perceived by the human body. Using these measures it is possible in combination with the influencing of the acoustically perceived air-borne sound to generate both positive and negative interferences of the artificial secondary vibrations with the primary vibrations forming on the vehicle side when the vehicle is in operation. The interferences can, as desired, reduce the perceived impression or simulate a certain impression, such as a gear change in a vehicle provided with a continuously variable transmission. However, the measures mentioned above are quite complex. Furthermore, they always require the use of weight-increasing damping mats made of a damping material.

SUMMARY OF THE INVENTION

The object of the invention is to develop a method and a device which make it possible to influence favorably and inexpensively noises and vibrations generated by a vibration generator, in particular an engine, to an object connected to it, in particular a passenger compartment of a vehicle.

The object is achieved according to the invention by a method and by a device described hereinafter. Two measures make it possible in a simple and inexpensive way to intervene efficiently in the transfer of vibrations which are introduced by a vibration exciter (in particular by an engine) via an intermediate element (in particular an engine support) into an object connected to it, in particular a vehicle body, and consequently into the passenger compartment. First, an actuator (for example, a piezo element) arranged on the exciter side can generate controlled vibrations, and second, a detector arranged on the object side can detect residual vibration. The control system comprises the intermediate element and also the detector and the actuator, which are arranged at the opposite ends of the intermediate element. Although the opposing arrangement of the detector and the actuator is seemingly less favourable from production engineering and design aspects, and consequently also from the cost side, it is unexpectedly technically successful.

Surprisingly, the arrangement according to the invention produces a frequency-dependent magnification factor and a frequency-dependent phase shift that facilitates the reduction of noise and/or vibration and/or an unwanted noise and/or vibration pattern (sound design), to an unexpected degree and also produce an easier control algorithm for vibration damping and/or a desired sound design.

This is of particular advantage since an engine is a solid component and consequently acts as a quasi-fixed supporting body for the piezo actuator. The inert engine block forms a virtual fixed point for the engine support or the vehicle body, which can be induced to undergo vibrations easily and with little energy. The detector, on the other hand, is arranged in a region of the acoustically softer object, since even low-energy excitations lead to relatively easily measurable excitation amplitudes.

The excitable piezo actuator and the detector, preferably likewise designed as a piezo element, can have a simple configuration such as an underlay shim and/or packing shim. As a result, one of the effects of the invention is to save costs, due for example to the simplification of the design requirements, to simplified component geometries, consequently cost saving in casting etc., and to a possible reduction in sound-damping measures, such as damping mats and the like.

Other objects, advantages and novel features of the present invention will become apparent from the following detailed description of the invention when considered in conjunction with the accompanying drawings.

DETAILED DESCRIPTION OF THE DRAWINGS

Figure 1:
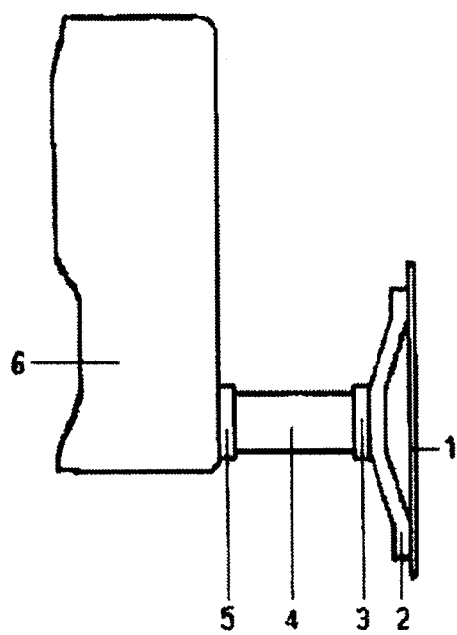
FIG. 1 shows a detail of the connection between the engine, engine supports and vehicle body.

Shown in FIG. 1 is an engine 6, which is fastened to one end of an engine support 4. The other end of the engine support is fastened, via a reinforcing flange 2, to the vehicle body of a motor car. Arranged between the engine support 4 and the engine 6 is an underlay shim, which acts as an actuator 5. The actuator 5 is a piezo element, which can be induced to undergo controlled vibrations. Arranged between the engine support 4 and the reinforcing flange 2 is a further underlay shim. The further underlay shim may be a detector 3 for vibrations and may also be designed in particular as a piezo element.

For the purposes of the invention, consequently, the engine corresponds to the vibration generator 6, the engine support corresponds to the intermediate element 4 and the group comprising the reinforcing flange 2, the vehicle body and, if appropriate, an engine mount corresponds to the object 1.

Of course, the arrangement according to the invention of an actuator 5 and a detector 3 may take place not only in connection with a single intermediate element but also in connection with a plurality of intermediate elements, by which the vibration generator is secured. In this case it must then be ensured in respect of the applied algorithm of the control systems that no overriding occurs.

Figure 2:
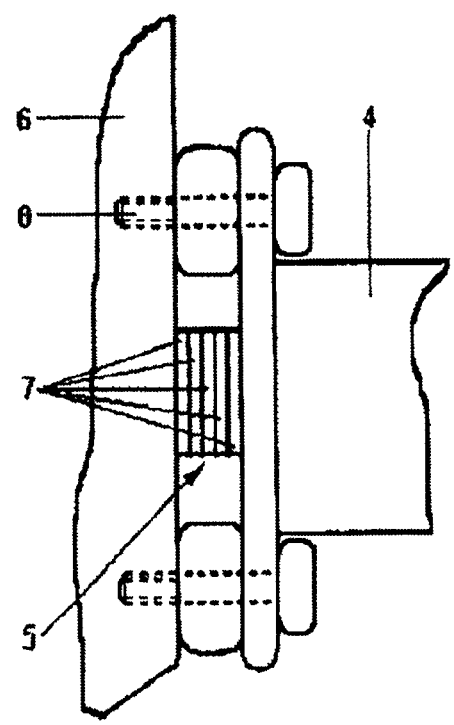
FIG. 2 shows a detail of a connection between the engine supports and the engine.

FIG. 2 shows in detail a possible connection of an engine and an engine support. In this embodiment, there is an intermediate space between the bolts 8 which releasably connect the engine to the engine support. Placed in the intermediate space as a packing shim, preferably with prestress, is an actuator 5. The actuator 5 is designed as a multilayer piezoceramic (layers 7). In an analogous way, the detector (not shown in FIG. 2) may be formed and arranged in the region of transition between the engine support and the object. The detector 3 may also be a piezo element, with which accelerations can be measured.

Depending on the application, the piezo actuators 5 and the piezo detectors 3 may be monolithically solid and/or formed from a plurality of superimposed individual layers of, in particular, film-like and/or wafer-like piezoceramics. In comparison with a solid construction with the same loading and the same active surface area, the voltage is reduced, while the current is increased, in the multilayer systems.

Figure 3:
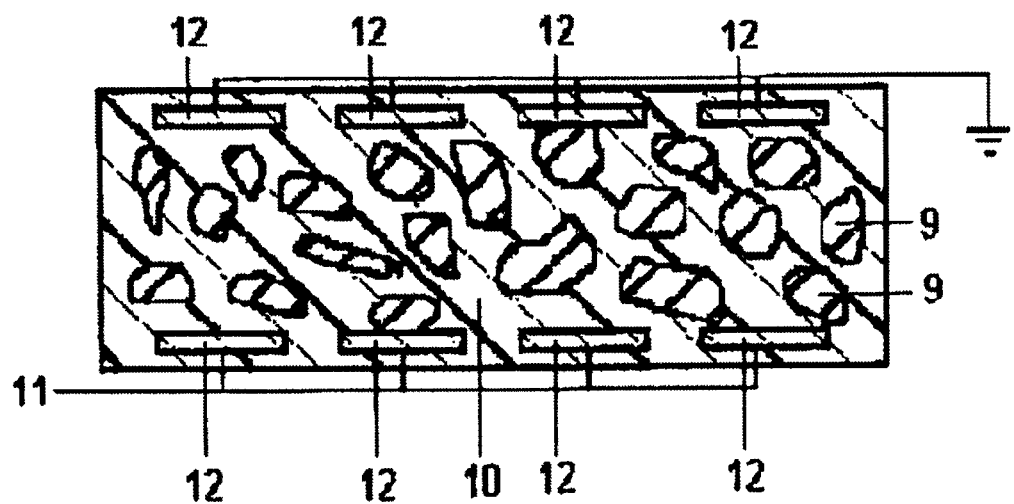
FIG. 3 shows a 0-3 piezoceramic-polymer composite for an actuator and/or a sensor.
Figure 4:
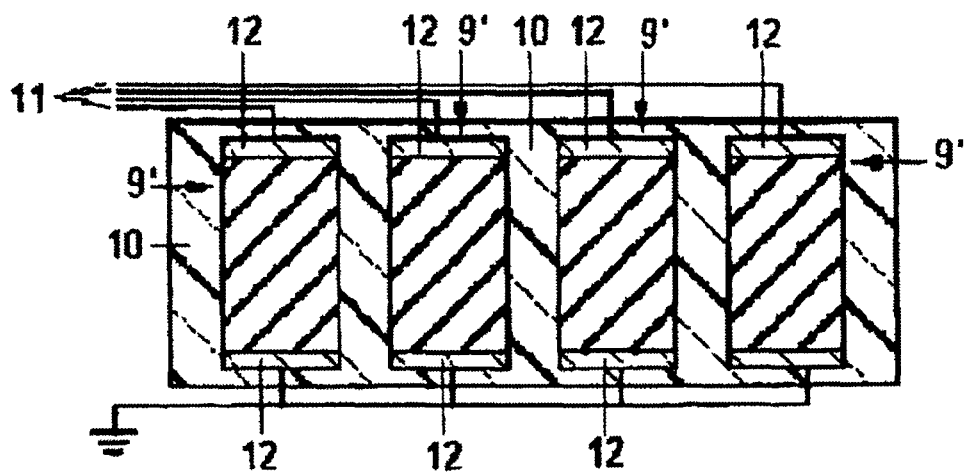
FIG. 4 shows a 1-3 piezoceramic-polymer composite for an actuator and/or a sensor.

Instead of an arrangement shown in FIGS. 1 and 2 as a solid or multilayer underlay shim (FIG. 1) and/or packing shim (FIG. 2), the piezo elements may expediently, as shown in FIGS. 3 and 4, also have piezo particles 9, 9', which are integrated in a polymer matrix 10.

FIG. 3 shows a polymer matrix 10 of preferably electrically conducting plastic, in which a plurality of piezo particles 9, forming a piezo element, of any desired size, orientation and physical form, are embedded. An arrangement of this type is referred to generally as a 0-3 piezoceramic-polymer composite. Arranged on the walls are electrical contacts 11, which are connected by electrical control lines 11 to a control unit (not shown).

The electrical contacts 12 can be used to activate selectively the individual piezo particles 9. It is also possible to obtain an electric voltage, which may be generated, for example, by vibrations exerting a pressure on and deforming the piezo particles 9.

Shown in FIG. 4 is another polymer matrix 10, in which a plurality of piezo particles 9' are likewise embedded. In contrast to the embodiment shown in FIG. 3, these piezo particles 9' are of a certain size and shape and are similarly oriented. An arrangement of this type is generally referred to as a 1-3 piezoceramic-polymer composite.

Likewise arranged on the walls of the polymer matrix 10 are electrical contacts 12, which are likewise connected by electrical control lines 11 to a control unit (not shown). In contrast to FIG. 3, in the embodiment of FIG. 4 each piezo particle 9' is individually electrically wired and can consequently also be individually activated.

By means of the electrical contacts 12, the individual piezo particles 9' can be induced to generate secondary vibrations of desired frequencies and amplitudes. The secondary vibrations can be made to interfere with and/or be superimposed on the transferred primary vibrations. In the case of negative interference, noises and/or vibrations can at least be reduced, while in the case of superimposing, a desired sense of driving, that is, the acoustic and/or vibrational sensory perception of driving can be generated.

Altogether, the transfer function between a vibration generator 6 and the object 1 connected to it via an intermediate element 4 and vice versa can be changed by the use of the actuators 5. Using piezo elements which can be controlled by a closed-loop control, this can be done variably and reversibly, making it possible to influence and tune the vibrations.

Figure 5:
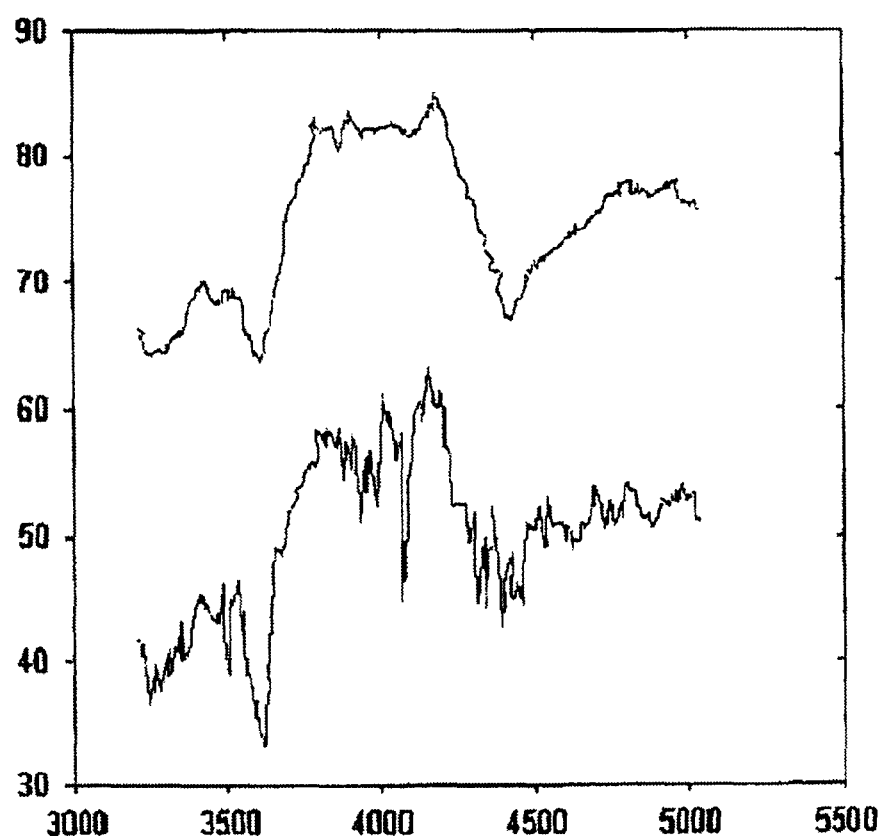
FIG. 5 shows a diagram of the power output level of the 18th engine order in dB in dependence on the engine speed of a comparative measurement with uninfluenced vibration transfer and vibration transfer influenced according to the invention.

The effects of the present invention are shown in FIG. 5. FIG. 5 shows a diagram of the power output level of the 18th engine order in dB as a function of engine speed for uninfluenced vibration transfer and for vibration transfer influenced according to the invention. The uninfluenced result is represented by the upper curve, the result with influencing according to the invention is represented by the lower curve.

The diagram was recorded with the engine running up between 3000 revolutions per minute (rpm) and 5500 rpm. As can be seen with a comparison of the upper curve with the lower curve, the reduction, in particular at the 3600 rpm amplitude, was about 30 dB. The reductions at the other frequencies are not significantly less. With the piezo elements switched off, the power output level was between about 63 dB and about 85 dB. With influencing according to the invention, that is with actuators 5 activated and induced to generate secondary vibrations based on the vibrations detected by the detectors 3, the power output level was approximately 30 dB. This means a significant reduction in the power output level.

The "in situ" determination of the actual, transferred vibrations by the detector 3 allows the secondary vibrations to be always changed on the basis of the transferred vibrations.

An active piezo element having contacts 12, according to FIGS. 3 and 4, is preferably structurally aligned, for example, with the assistance of a groove. The alignment of these piezo elements serves the purpose that the axis of the piezo elements 9, 9' points at least approximately in the direction of the highest amplitude and/or in the direction of power flux.

One special advantage of the invention is that the arrangement of the actuators 5 and the detectors 3 at the opposite regions of the engine support makes it possible that only small displacements are necessary for influencing the noises. This applies both when producing and/or increasing a certain noise impression and when reducing and/or suppressing certain noises.

Furthermore, because of the small displacements and the small power loss when piezo elements are used, the energy requirement is favourably low.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for influencing the transfer of vibrations of a vibration generator to an object which is connected to the vibration generator via an intermediate element which transfers primary vibrations between the vibration generator and the object, the method comprising:

providing at least one actuator in the form of a piezo element arranged in proximity to the intermediate element;

inducing the actuator to undergo secondary vibrations in a controlled manner, whereby the total energy and/or the composition of the frequencies of the vibrations transferred via the intermediate element are changed by the actuator;

measuring remaining residual vibration;

and using the measured residual vibrations to control the secondary vibrations; wherein, the secondary vibrations are introduced in the region between the vibration generator and the intermediate element; and the residual vibration is measured in the region between the intermediate element and the point at which the intermediate element bears against the object.

2. A device for influencing the transfer of vibrations of a vibration generator to an object connected to it via an intermediate element, said device comprising:

at least one actuator in the form of a piezo element, which can be induced to undergo controlled secondary vibrations; and a detector arranged in a region between the intermediate element and the object; wherein the actuator is arranged in the region between the intermediate element and the vibration generator; and the detector is arranged in the region between the intermediate element and the object.

3. The device according to claim 2, wherein the actuator is arranged in an underlay shim.

4. The device according to claim 2, wherein the actuator comprises an underlay shim.

5. The device according to claim 2, wherein the actuator is arranged in a packing shim or in a spacer.

6. The device according to claim 2, wherein the actuator is a packing shim or a spacer.

7. The device according to claim 2, wherein the detector is a piezo element.

8. The device according to claim 2, wherein the detector is arranged in an underlay shim.

9. The device according to claim 2, wherein the detector comprises an underlay shim.

10. The device according to claim 2, wherein the detector is arranged in a packing shim or in a spacer.

11. The device according to claim 2, wherein the detector is a packing shim or a spacer.

12. The device according to claim 2, wherein the detector is an acceleration sensor.

13. The device according to claim 2, wherein the detector is an acceleration sensor.

14. A method for influencing the transmission of primary vibrations generated by a vibration generator to an object connected to the generator via an intermediate element, the method comprising:

controlling an actuator positioned between the vibration generator and the intermediate element to generate secondary vibrations designed to cancel the vibrations generated by the vibration generator;

measuring the vibrations at a point between the intermediate element and the object; and adjusting the secondary vibrations generated by the actuator based on the vibrations measured at the point between the intermediate element and the object to minimize the vibrations transmitted to the object through the intermediate element.

15. A device for influencing the transmission of primary vibrations generated by a vibration generator to an object connected to the generator via an intermediate element, the device comprising:

at least one actuator positioned between the vibration generator and the intermediate element to generate secondary vibrations designed to cancel the vibrations generated by the vibration generator; and a detector positioned between the intermediate element and the object to measure the vibrations at a point between the intermediate element and the object, wherein the secondary vibrations generated by the actuator are adjusted based on the vibrations measured at the point between the intermediate element and the object to minimize the vibrations transmitted to the object through the intermediate element.

16. The device according to claim 15, further comprising an underlay shim positioned between the vibration generator and the intermediate element, wherein the underlay shim includes the actuator.

17. The device according to claim 15, further comprising a packing shim positioned between the vibration generator and the intermediate element, wherein the packing shim includes the actuator.

18. The device according to claim 15, further comprising an underlay shim positioned between the intermediate element and the object, wherein the underlay shim includes the detector.

19. The device according to claim 15, further comprising a packing shim positioned between the intermediate element and the object, wherein the packing shim includes the detector.

20. The device according to claim 15, wherein the detector is an acceleration sensor.

21. The device according to claim 15, wherein the detector is a 3-D acceleration sensor.

* * * * *